US010547532B2

(12) United States Patent
Vinsel et al.

(10) Patent No.: US 10,547,532 B2
(45) Date of Patent: Jan. 28, 2020

(54) PARALLELIZATION OF INLINE TOOL CHAINING (71) Applicant: NetScout Systems, Inc., Westford, MA (US)

(72) Inventors: Peter C. Vinsel, Berkeley, CA (US); Andrew R. Harding, Scotts Valley, CA (US); Gordon Beith, San Jose, CA (US); Erik W. Hjelmstad, Colorado Springs, CO (US)

(73) Assignee: NetScout Systems, Inc., Westford, MA (US)

( * ) Notice: Subject to any disclaimer, the term of this patent is extended or adjusted under 35 U.S.C. 154(b) by 102 days.

(21) Appl. No.: 15/444,120

(22) Filed: Feb. 27, 2017

(65) Prior Publication Data

US 2018/0248778 A1 Aug. 30, 2018

(51) Int. Cl.
*H04L 12/26* (2006.01)
*H04L 29/06* (2006.01)
*H04L 29/08* (2006.01)

(52) U.S. Cl.
CPC .......... *H04L 43/0852* (2013.01); *H04L 43/12* (2013.01); *H04L 67/2819* (2013.01); *H04L 69/22* (2013.01)

(58) Field of Classification Search
CPC ...................................................... H04L 69/22
See application file for complete search history.

(56) References Cited

U.S. PATENT DOCUMENTS

| 8,040,901 B1* | 10/2011 | Kompella | H04L 12/437 370/395.71 |
| 2008/0028467 A1* | 1/2008 | Kommareddy | H04L 63/1458 726/23 |
| 2014/0269294 A1* | 9/2014 | Morandin | H04L 47/826 370/234 |
| 2017/0026289 A1* | 1/2017 | Vinsel | H04L 45/7453 |

* cited by examiner

*Primary Examiner* — Esther B. Henderson
(74) *Attorney, Agent, or Firm* — Locke Lord LLP; Scott D. Wofsy; Christopher J. Capelli (57) ABSTRACT A method for parallel processing of ingress packets destined to a plurality of inline tools is provided. An ingress packet is processed to extract a plurality of packet header fields and to generate a packet identifier. A hash index is generated by hashing information associated with the plurality of packet header fields. A copy of the ingress packet and the packet identifier are stored in a hash table entry using the generated hash index. The ingress packet is simultaneously forwarded to each of the plurality of inline tool devices.

20 Claims, 5 Drawing Sheets

PARALLELIZATION OF INLINE TOOL CHAINING

FIELD OF THE INVENTION

The present elates generally to computer networks and, more particularly, to parallelization of inline tool chaining.

BACKGROUND OF THE INVENTION

Communication networks are important for providing data and voice communication. Communication networks allow many different computing devices, for example, personal computers, IP telephony devices or servers to communicate with each other and/or with various other network elements or remote servers attached to the network. Such networks regularly include many interconnected nodes, commonly known as switches or routers, for routing traffic through the network. Monitoring networks is important to ensure reliable operation, fault detection, timely mitigation of potentially malicious activities, and more. Network taps are generally known in the art for connecting to networks and providing a port to monitor the communication traffic on the network.

Firewalls and intrusion detection systems are security devices/tools that are used to protect a computer network from unauthorized or disruptive users. A firewall can be used to secure a local area network from users outside the local area network. A firewall checks, routes, and frequently labels all messages sent to or from users outside the local area network. An intrusion detection system (IDS) can be used to examine information being communicated within a network to recognize suspicious patterns of behavior. Information obtained by the IDS can be used to indirectly block unauthorized or disruptive users from accessing the network. An intrusion prevention system (IPS) is an in-line version of IDS. An IPS can be used to examine information as it is being communicated within a network to recognize suspicious patterns of behavior and directly block suspicious sessions and unauthorized or disruptive users.

Network performance depends on many factors, such as loss, throughput, latency, bandwidth, jitter and throughput. Meeting high network performance standards can prove to be quite challenging. While methods are available that can significantly reduce the effects of insertion of various security devices within communication networks, such network security supplements can still prevent meeting the performance standards. It is desirable to reduce the overall packet latency and increase network responsiveness when a plurality of inline security devices is chained together.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a communication system which includes a plurality of inline tool devices configured to monitor and analyze a flow of network traffic is provided. The system further includes an Advanced Inline Aggregation (AIA) device connected to each one of the plurality of inline tool devices. The AIA device stores therein a plurality of programming instructions, which when executed on the AIA device cause the AIA device to process an ingress packet to extract a plurality of packet header fields and to generate a packet identifier. The plurality of program instructions further includes program instructions which cause the AIA device to generate a first hash index by hashing information associated with the plurality of packet header fields and cause the AIA device to store a copy of the ingress packet and the packet identifier in a hash table entry using the generated first hash index. The plurality of program instructions further includes program instructions to simultaneously forward the ingress packet to each one of the plurality of inline tool devices and start a latency timer with a predefined timer value. Additionally, the plurality of program instructions also includes program instructions which cause the AIA device to process an egress packet received from one of the plurality of inline tools to extract the plurality of packet header fields, generate a second hash index by hashing information associated with the plurality of egress packet fields and retrieve the packet identifier from the hash table based on the generated second hash index. Furthermore, the plurality of program instructions includes program instructions to increment a counter value associated with the egress packet and determine whether the latency timer is greater than zero. If the latency timer is equal to zero, the plurality of program instructions further includes program instructions to determine whether the counter value is equal to a total number of devices included in the plurality of inline tool devices and to transmit the egress packet to a switching device based on the retrieved packet identifier, in response to determining that the counter value is equal to the total number of devices.

In another aspect, a method for parallel processing of ingress packets destined to a plurality of inline tools is provided. An ingress packet is processed to extract a plurality of packet header fields and to generate a packet identifier. A hash index is generated by hashing information associated with the plurality of packet header fields. A copy of the ingress packet and the packet identifier are stored in a hash table entry using the generated hash index. The ingress packet is simultaneously forwarded to each of the plurality of inline tool devices.

In yet another aspect, a method for parallel processing of egress packets received from a plurality of inline tools is provided. An egress packet is processed to extract a plurality of packet header fields. A hash index is generated by hashing information associated with the plurality of packet header fields. A packet identifier is retrieved from a hash table based on the generated hash index. A counter value associated with the egress packet is incremented. A determination is made whether a latency timer with a predefined timer value is greater than zero. A determination is made whether the counter value is equal to a total number of devices included in the plurality of inline tool devices, in response to determining that the latency timer is equal to zero.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention. For example, reference is made to Ethernet Protocol but other protocols can be used in the invention. The embodiments of the invention are applicable to both electrical wire and optical fiber technologies.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

As used herein, a "link" can include a communication channel that connects two or more communicating network elements. The term "network element" encompasses computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "ingress" refers to the arrivals direction in which packets are processed; while the term "egress" refers to the departure direction in which packets are processed. For example, an ingress port typically refers to the port on which a packet is received by a packet switching device, and an egress port typically refers to the port from which a packet will exit a packet switching device.

Various embodiments of the present invention contemplate the hardware (inline security tools) that support many classical "bump-in-the-wire" functions, such as firewall filtering, IPsec gateway, traffic prioritization, etc. Historically, from network performance perspective, one of the primary concerns is that such hardware may cause a network outage. Many existing packet flow switching systems complement existing security tools by providing an effective and highly available failsafe capture and forwarding element, which can increase effectiveness and scale of security tools by simultaneously off-loading packet capture, filtering and load balancing from CPUs of these tools. Processing power of security tools is thereby freed for the necessary logic, parsing, I/O operations, etc. It should be noted that the term "packet flow switch" is generally used to refer to any network packet broker and/or any intelligent aggregation device.

Existing packet flow switching systems have also simplified the insertion of multiple security tools by enabling multiple options for at least one logical "chain" of security devices (tools) to be used in combination on a single or multiple flows of traffic with just a single "break in the wire". While these logical tool chains enable multiple layers of security, and packet flow switching systems simplify such deployments by avoiding having multiple single points of failure, invariably, there is a cost to adding these logical chains. The cost manifests itself through increased latency—the additive latency of every security element in a chain. This additive latency can exhaust the latency requirements in a network and result in poor performance. Indirect effects of the increased latency (hence increased Round Trip Time (RTT)) caused by the transit of a packet through the conventional security tools chain implementation includes reduced TCP throughput and increased packet memory requirements. These increased costs may result in a situation where the benefits of the functions provided by the conventional security tool chains are insufficient to overcome the additional costs either in computation, latency, or both, resulting in an overall degradation of the network system. In various embodiments of the present invention, an enhanced Advanced Inline Aggregation (AIA) device connected to the chain of inline tools compensates the increased latency by forwarding the traffic through each tool in parallel, as described in greater detail below.

Figure 1:
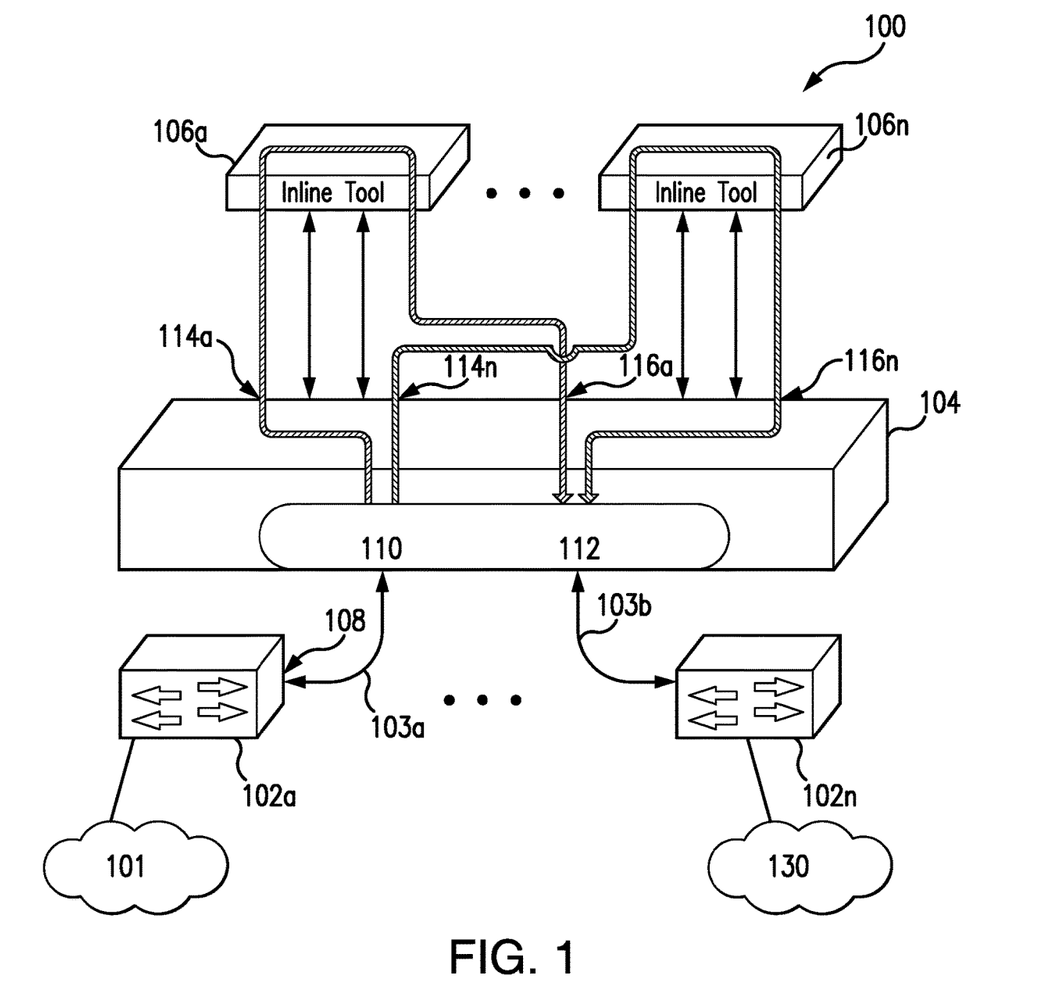
FIG. 1 is a block diagram illustrating internal network configuration capable of routing traffic flows between network elements and inline processing tools in parallel, in accordance with an embodiment of the present invention.

Turning now descriptively to the drawings, in which similar reference characters denote similar elements throughout the several views, FIG. 1 is a block diagram illustrating internal network configuration capable of routing traffic flows between network elements and inline processing tools in parallel, in accordance with an embodiment of the present invention. The network monitoring system 100 illustrated in FIG. 1 includes a plurality of network switches 102a-102n. As one of ordinary skill in the art will appreciate, each network device in system 100 can be physically associated with a port of a network switch to which it is connected. Data packets pass through the network. Data frames, or packets, can be transferred between network devices by means of a switch's logic link control (LLC)/media access control (MAC) circuitry, or "engines", associated with ports on a network device, e.g., switches 102a-102n. The network switch 102a forwards data frames received from a transmitting network device to a plurality of inline tools 106a-106n. The network switch 102n forwards data frames processed by inline tools 106a-106n to a destination network device based on the header information in the received data packets. The switch 102n can also forward packets from a given network to other networks through ports on one or more other switches.

Network monitoring inline tools 106a-106n typically analyze frames or packets of data as they pass through a network. The medium on which the data is carried is typically optical fiber or copper cable. The inline tools 106a-106n require access to this medium in order to obtain visibility of the data passing through it. This requires the network monitoring inline tools 106a-106n to be placed either in-line with the network link or on the span port output of a network switch or router. In FIG. 1 there is shown the connection of the network monitoring inline tools 106a-106n to a bypass port 108 of the network switch 102a (through aggregation tool 104 described below). The method of gaining access to data on the network link is commonly referred to as "tapping".

In-line tapping may be achieved using passive or active (also known as bypass) tapping methods. Both of these methods require that the insertion into the network be unobtrusive so as not to affect the transmission of data between the devices on the network. An active tap re-drives the network data passing though the bypass port 108 such that the ongoing signal passed back to the network switch 102n is not degraded. A passive tap typically does not provide for any regeneration of the signal.

Thus, active tapping is achieved in the configuration illustrated in FIG. 1 using port-bypass features of the switch 102a in the front-end portion of the network monitoring system 100. It is noted that in various embodiments, network monitoring inline tools 106a-106n, may comprise any inline data processing device including, without limitation, any suitable inline network device configured to manage network access, perform load balancing and/or configured to provide high availability/fail-over of in-line network devices (e.g., intrusion prevention systems, web application filters, proxy servers, and WAN accelerators).

As shown in FIG. 1, the network monitoring system 100 may further include an Advanced Inline Aggregation (AIA) device 104. In one embodiment, the AIA device 104 comprises a TAP (Test Access Point), which is an active TAP installed between the plurality of inline tools 106a-106n and the corresponding networks 101 and 130. Networks 101 and 130 are connected to the AIA device 104 via switches 102a and 102n, respectively. In one embodiment, the advanced AIA device 104 comprises a Field-Programmable Gate Array (FPGA) device. FPGA's are Integrated Circuit (IC) devices comprising a large number of logic blocks and input/output blocks, interconnected through a network of programmable interconnects, so that a high degree of flexibility is obtained in terms of the functionality of the device. Interconnect routing, through the programmable interconnects, is typically realized in the Front-end-of-line (FEOL) part of the FPGA's production process, which is the part wherein the FPGA's logic blocks are created on a semiconductor substrate.

It is noted the AIA device 104 receives data from network link 103a through an ingress port 110 on ingress side of the AIA device 104, makes a copy of the data for subsequent processing and sends the data to the egress side of the AIA device 104 connected to the plurality of inline tools 106a-106n through a plurality of egress ports 114a-114n of the AIA device 104. AIA device 104 transmits both the send and receive data streams simultaneously on separate dedicated channels, ensuring all data arrives at the network security and performance tools 106a-106n in real time. According to an embodiment of the present invention, the AIA device 104 includes a hash table storage, software/hardware logic programmed to perform various packet processing operations (including steps described in conjunction with FIGS. 4 and 5 below), and multiple ports. In one embodiment, such software logic comprises a software program executed by a general purpose processor. In several embodiments, such hardware logic comprises programmable logic components (e.g. FPGA, or complex programmable logic device (CPLD)). In another embodiment, AIA device's 104 logic is implemented using any number of discrete logic components. In yet another embodiment, AIA device's processing circuitry is implemented using an application specific integrated circuit (ASIC). It is appreciated that the network monitoring system 100 can include any number of physical switches 102a-102n, physical or virtual routers and other physical or virtual network elements, without deviating from the present disclosure. Since the AIA device 104 aggregates the traffic before sending it to the inline tools 106a-106n, it should also be able to split out the traffic received back from the inline tools 106a-106n. Once the AIA device 104 receives data back through ports 116a-116n, the AIA device 104 selectively redelivers the data onto the network link 103b through an egress port 112. The network link 103b connects the AIA device 104 to a network switch 102n, which is further connected to the exemplary network 130.

In one embodiment of the present invention, each of the network switches 102a-102n may comprise a VLAN enabled switch. A virtual local area network (LAN) or "VLAN" is a logical subdivision of a Layer 2 network that makes a single Layer 2 infrastructure operate as though it were multiple, separate Layer 2 networks. This is accomplished by adding a numeric tag field (e.g., a VLAN tag) to each data packet as it leaves a Layer 2 switch which identifies the VLAN number to which the packet belongs. Other VLAN-enabled switches honor the VLAN numbering scheme to segregate the network into logical, virtual networks.

Generally, predictable performance is critical to both networking and network security, because it ultimately determines availability. Traffic bursts and variance in packet payloads and payload size can have an impact on performance of different inline tools 106a-106n in different ways. Various embodiments of the present invention solve the problem of additive latency in networks with a plurality of active security elements (i.e., inline tools 106a-106n) that operates on a single set of certain traffic flows. Latency refers generally to delays in processing network data, of which there are several kinds. As used herein, latency refers to the amount of time it takes collectively for one or more defined inline tools 106a-106n to pass the received packet.

Latency can be calculated using the following equation (1):

$$L_{set} = \Sigma_1^n (d\text{trans} + d\text{prop} + d\text{proc} + d\text{queue}), \quad (1)$$

where $L_{set}$ represents a detailed end-to-end latency, $d_{trans}$ represents transmission time for each inline tool, $d_{prop}$ represents propagation time for each inline tool, $d_{proc}$ represents processing time for each inline tool, $d_{queue}$ represents queuing time for each inline tool, and n represents a number of inline tools.

Figure 2:
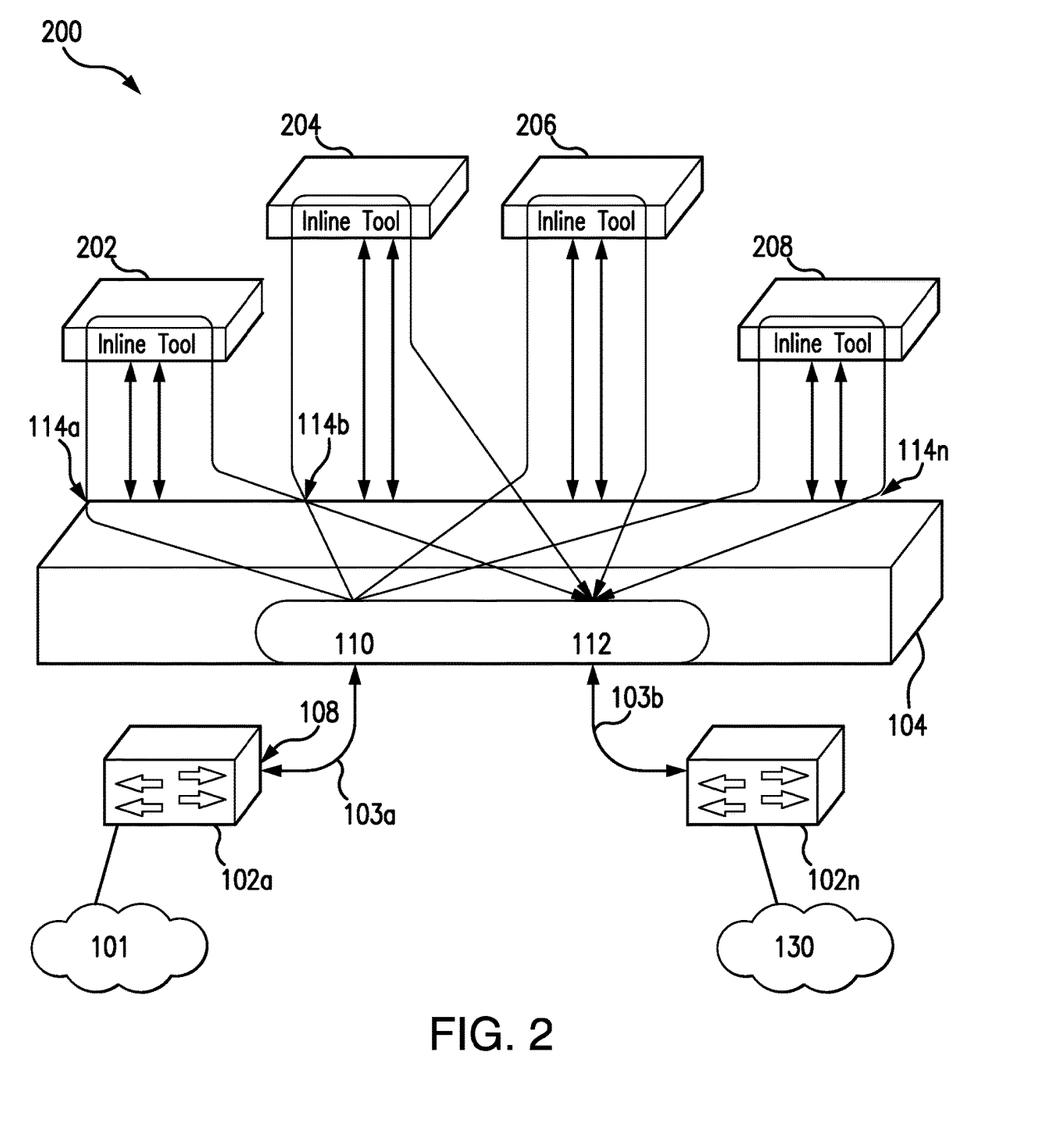
FIG. 2 is a block diagram illustrating alternative configuration of inline processing tools, in accordance with another embodiment of the present invention.

It should be noted that the sum of delays for any of a variety of elements available in a chain of inline tools can differ due to the behavior of each tool and the traffic passed. FIG. 2 is a block diagram illustrating alternative configuration of inline processing tools, in accordance with another embodiment of the present invention. In this illustrative embodiment, the communication system 200 includes four exemplary inline tools: an SSL Proxy (SSL) 202, a firewall 204, an IPS 206 and a sandbox security server 208 and further includes a single AIA device 104. The total latency of system 200 will vary because the delay of each element 202-208 in the chain can vary. In this illustrative example the total latency of the system 200 can be calculated using equation (2):

$$L_1 = AIA_d + SSL_d + FW_d + IPS_d + SBX_d \quad (2)$$

In equation (2), $L_1$ represents the cumulative amount of time the AIA device 104 and the inline tools 202-208 each require to perform their respective "chained" tasks. In one non-limiting embodiment, the AIA device 104 is a hardware appliance, such as FPGA, so its port-to-port latency (i.e., latency between ports 110-112 and 114a-114n) is usually only single or double digit microseconds. On the other hand the inline tools 202-208 typically include software running on general-purpose computer hardware, with latencies that are roughly single, double, or even triple digit milliseconds (ms). In other words, latency of various inline tools 202-208 can be roughly 1000 times greater than the latency of the AIA device 104. In the exemplary network 200, the combined inline tool's latency value can be significantly high, exceeding system's maximum acceptable total latency value.

Advantageously, according to embodiments of the present invention, the AIA device 104 instead of conventionally sending traffic through the chain of inline tools 202-208 in a serial fashion, forwards traffic through each inline tool 202-208 at the same time in parallel. It should be noted that in this embodiment, for the packets in a new data flow the first inline tool in the illustrated chain, the SSL device 202, normally needs to process the received packets and perform packet modification, but only for the encrypted packets. Thus, in this embodiment, the AIA device 104 processes each received packet to determine if it contains an encrypted payload and sends encrypted (i.e., HTTPS) packets to the SSL device 202 in a serial fashion, while at the same time allowing packets not containing any encrypted payload to bypass the SSL device 202, if so desired, using filtering. At the SSL device 202 the received data flow traffic may be decrypted with an untraceable IP address. According to this embodiment, the AIA device 104 then sends the packets containing no encrypted payload and packets newly decrypted by the SSL device 202 and containing only clear text data to other inline tools 204-208 in the chain, which typically do not modify the received packets. Instead of sending each received packet to each inline tool 202-208 and receiving those packets back on the AIA device 104, before sending them to the next tool, the enhanced AIA device 104 sends each received packet to each non modifying tool 204-208 in the chain substantially at the same time. The AIA device 104 holds the newly sent packet in a memory buffer (i.e., a packet table described below). The AIA device 104 would then forward the packet to the switch 102n only if all of the tools 202-208 in the chain have returned the same packet back to the AIA device 104, as explained below. In other words, if any of the inline tools 202-208 drops a single packet, then the AIA device 104 prevents this packet from being sent to the switch 102n. After the processing/inspection is done by all of the inline tools 204-208 and the packet is returned back to the AIA device 104, the SSL proxy 202 needs to re-encrypt the previously encrypted data and relay it back to the second switch 102n in the same fashion it was received from the first switch 102a.

It should be noted that while the inline tools typically do not modify the received packets, in one embodiment, the AIA device 104 may facilitate packet modification by one or more inline tools 202-208. In this embodiment, users may configure layer 2 fields (i.e., source & destination MAC addresses), layer 3 fields (source & destination IP addresses), layer 4 fields (port numbers) and a user defined offset/mask for layer 4+ fields to be modifiable by inline tools 202-208. User configuration may also indicate to the AIA device 104 how to handle these packets when they are returned. For instance, such configuration may indicate which modified packets should be returned back to the network. In this implementation, the AIA device 104 buffers the packet from one selected tool and transmits it when the AIA device 104 determines that the packet should be passed back to the network based on receiving the packet from the other tools.

Advantageously, various embodiments of the present invention can be used to reduce the cumulative latency value L, wherein L can be expressed by the following equations (3) and (4):

$$L_1 = AIA_d + SSL_d + \text{MAX}(FW_d + IPS_d + SBX_d) \quad (3)$$

$$L_2 = AIA_d + \text{MAX}(FW_d + IPS_d + SBX_d), \quad (4)$$

wherein $L_1$ represents the cumulative latency for the encrypted traffic and $L_2$ represents the cumulative latency for the unencrypted traffic. This substantially reduced latency can enable at least some of the inline tools 202-208 to be used with applications and in environments where previously known approaches simply would not work due to performance constraints. According to embodiments of the present invention, the enhanced AIA device 104 can further smooth out latency, by replacing the maximum value of the sum of all latencies associated with non-modifying tools in equations (3) and (4) with the max value of a single non-modifying tool. This smoother maximum non-modifying tools' latency value typically increases in a more consistent fashion as opposed to the maximum value of the sum of all latencies associated with non-modifying tools in equations (3) and (4), which can change due to packet size or inspection policy.

Figure 4:
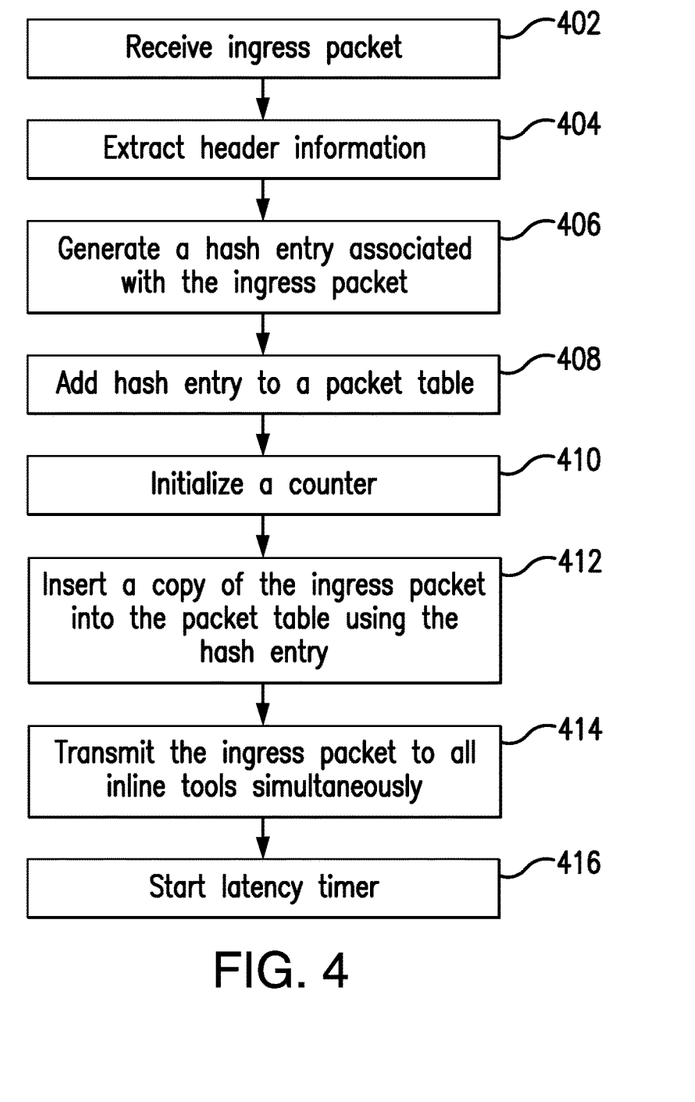
FIG. 4 is a flowchart illustrating exemplary steps performed by the AIA device of FIGS. 1 and 2 for processing ingress packets, in accordance with an embodiment of the present invention.
Figure 5:
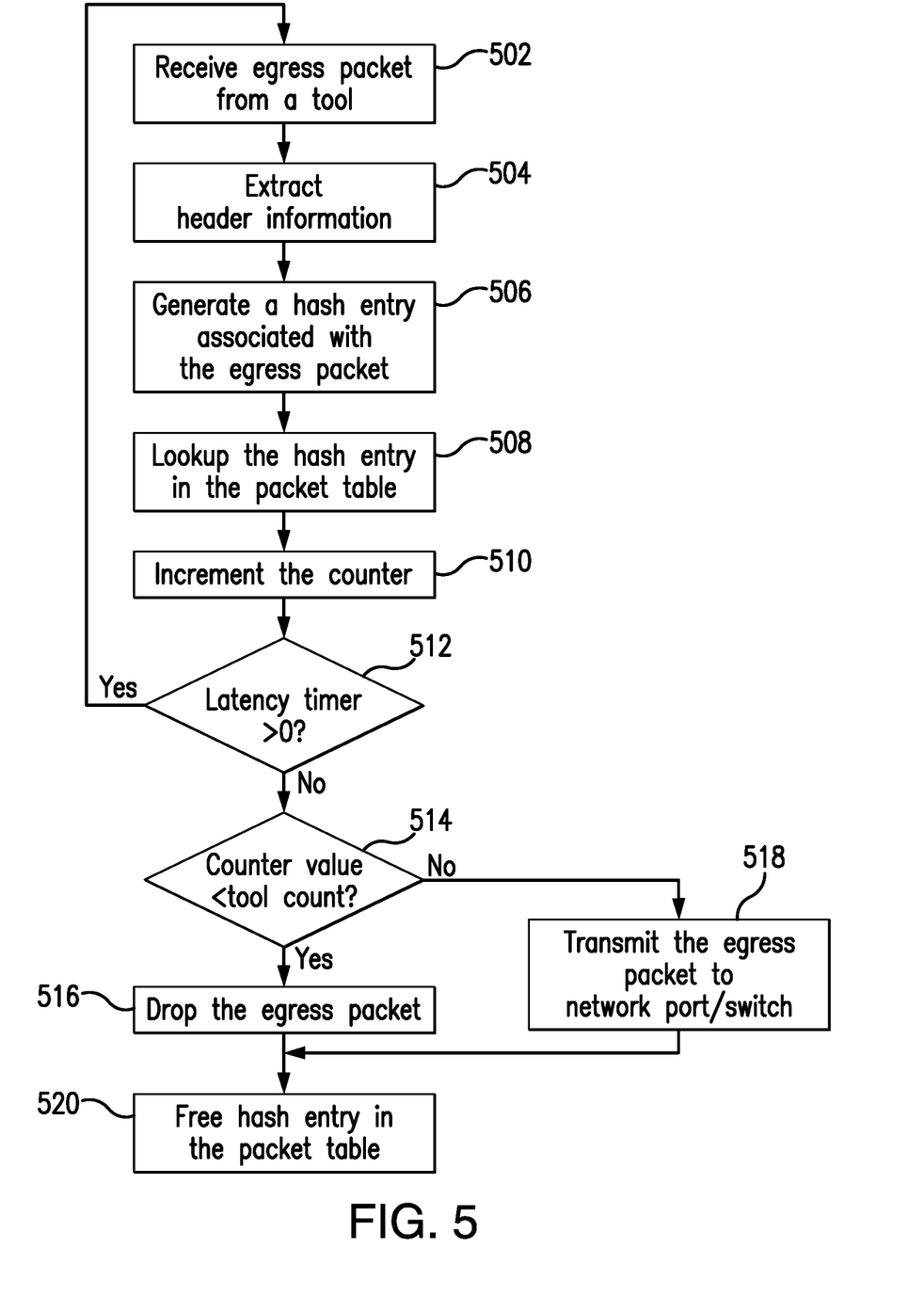
FIG. 5 is a flowchart illustrating exemplary steps performed by the AIA device of FIGS. 1 and 2 for processing egress packets, in accordance with an embodiment of the present invention.

FIGS. 4 and 5 are flowcharts illustrating exemplary steps for processing ingress and egress packets by the AIA device of FIGS. 1 and 2 using parallelization of inline tool chaining, in accordance with embodiments of the present invention. Before turning to descriptions of FIGS. 4 and 5, it is noted that the flow diagrams in FIGS. 4 and 5 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed.

In step 402, the AIA device 104 receives an ingress packet stream from the first network switching device 102a through the first ingress port 110, for example. In step 404, the AIA device 104 processes the received ingress packet stream by evaluating header fields of all received packets in accordance with pre-configured packet processing rules. For example, in step 404, the AIA device 104 may parse various packet header fields (such as MAC and IP header fields) and may extract relevant packet information from the received packet headers.

Figure 3:
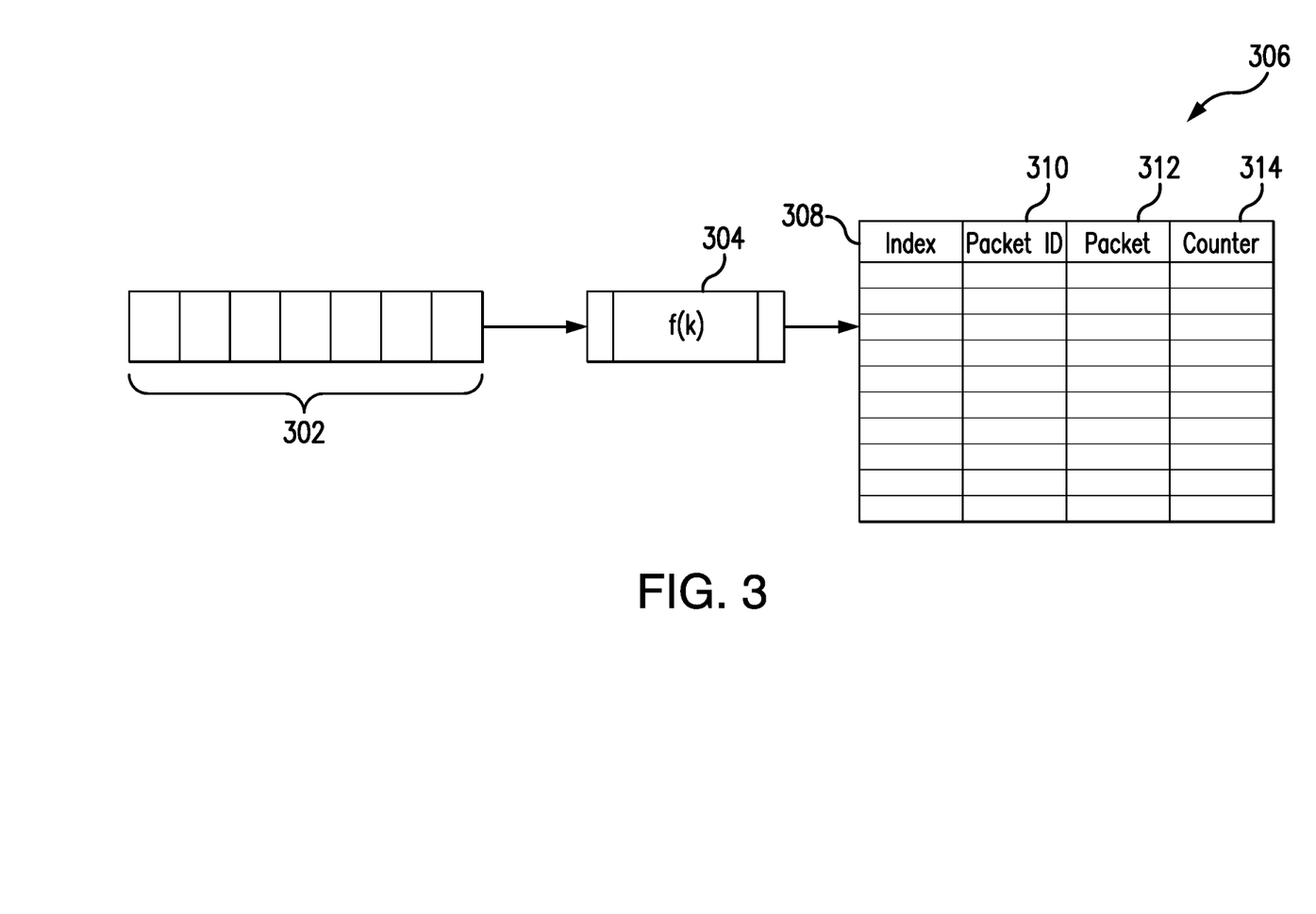
FIG. 3 shows the use of a hash table to store packet information, in accordance with an embodiment of the present invention.

According to an embodiment of the present invention, the AIA device 104 constructs packet table storage by a conventional local memory, for example, with using hash values as index. The packet table storage stores packet table 306 (shown in FIG. 3) therein. Specifically, FIG. 3 shows the use of a packet table to store packet information, in accordance with an embodiment of the present invention. A hash function is shown that is used to transform the packet header fields 302 into a numbered index location 308 of the packet table 306. The packet identification information 310 associated with the packet is saved at the index location 308 to facilitate later searching and retrieval.

The hash function f (K) 304 is selected to produce a uniform scattering of header fields' transformations across the numbered index of the packet table 306. Consequently, the function will depend on the variation of packet header fields. According to an embodiment of the present invention, a packet header may include the fields shown in table 1 below:

TABLE 1

| Field | Size |
|---|---|
| source address | 4 bytes (IPv4) or 16 byes (IPv6) |
| destination address | 4 bytes (IPv4) or 16 byes (IPv6) |
| protocol | 20 bits (IPv6 only) |
| TCP/UDP source port | 2 bytes |
| TCP/UDP destination port | 2 bytes |

Hash functions in general are well-known in the art. In one embodiment, a 12 bit (or larger) cyclic redundancy check (CRC) based hashing mechanism can be utilized since a relatively low number of bits is being hashed, thus providing a relatively high probability of uniqueness for a generated hash index 308. In other words, a 12-bit CRC hash function may provide desirable hash function features including collision resistance, which means that the hash function is very unlikely to generate the same hash for different inputs (header fields), and uniformity, which means that the hashes generated by the hash function are distributed evenly. It is noted the CRC selected is implementation dependent. For example, in alternative embodiment, a 32 bit CRC based hashing mechanism may be utilized.

In yet another embodiment, the AIA device 104 may utilize collision entries comprising a bit mask field. In one embodiment, the bit mask field is a 4-bit mask number which specifies one of sixteen functions which will be used to create a new packet table index when the lookup function is performed. This new packet table index will be used to access a packet table in case of a collision. For large enough packet tables, slot collisions of this kind are rare, and so, in some embodiments the hash functions provide no special provision to avoid duplicate hash slots among the packet table values. In alternative embodiments the AIA device 104 may handle collisions to ensure that it does not inadvertently pass a packet and so that there is no security issue. It should be noted that the AIA device 104 may incorrectly drop a packet in case of an improperly handled collision. It is further noted that, in one embodiment, each entry in the hash table storage may also include a timestamp indicating when an entry was last updated for aging out entries from table that equal or exceed a user-configurable age interval. In one embodiment the age interval may range from approximately 2 msec. to approximately 128 sec. The default value for the age interval may be, for example, approximately 10 msec. In various embodiments, users may adjust the age interval value based on the expected latency of the inline tools 106a-106n.

Referring back to FIG. 4, in step 406, according to an embodiment of the present invention, after parsing the header of the received packet (step 404), the AIA device 104 generates the hash table index 308 using extracted information associated with the packet header 302. As noted above the packet table 306 is indexed with the hash index 308 to store the associated ingress packet identification information 310 in an entry of the packet table 306 (step 408). While the foregoing describes indices 308 as hash values generated by a hash function, indices 308 of the packet table 306 may be other values generated by other functions, which are configured to generate indices.

Once the AIA device 104 completes the steps described above, in step 410, it initializes a counter. As noted above, according to an embodiment of the present invention, the AIA device 104 sends the packets to the plurality of inline tools 204-208 in the chain substantially simultaneously. In this embodiment, the AIA device 104 may utilize a counter 314 stored in the packet table 306 and initialized in step 410 to determine how many of the inline tools 204 have returned copies of the corresponding packets back.

According to an embodiment of the present invention, the AIA device 104 has to temporarily store the packets of data, which it receives from the units (i.e. network switches) connected to it while the chain of inline tools 204-208 performs respective functionality to determine whether to retransmit the packets towards their destination addresses. In one embodiment a copy of the ingress packet 312 can be stored in the same entry of the packet table 306. Next, each packet is transmitted ("broadcast") to the plurality of inline tools 204-208 at step 414. Instead of sending each received packet to each inline tool 202-208 and receiving those packets back on the AIA device 104, before sending them to the next tool, the advanced AIA device 104 sends each received packet to each tool 204-208 in the chain approximately at the same time.

Once the AIA device 104 completes transmission of the packets, in step 416, it starts a latency timer. According to an embodiment of the present invention, a maximum expected tool latency period may be set (configured) in accordance with what is considered to be a maximum processing latency of the chain of inline tools 202-208. But configuring such a period introduces a fixed processing latency for all packets. It is noted that steps 404-412 are repeated by the AIA device 104 for each packet in the received ingress packet stream. Accordingly, the AIA device 104 may aggregate a plurality of packets prior to sending them to the inline tools 202-208 in step 414.

FIG. 5 is a flowchart illustrating exemplary steps for processing egress packets, in accordance with an embodiment of the present invention. In step 502, the AIA device 104 receives an egress packet stream from one of the inline tools 202-208. It is noted that egress packets should travel from the inline tools 202-208 back to the network they originated from or to the destination network.

In step 504, the AIA device 104 parses various egress packet header fields, as described above in conjunction with FIG. 4. At least in some embodiments, inline tools 202-208 may be pre-classified, at least in part, by one or more humans into essential and non-essential categories, for example. In such embodiments, step 504 may further involve the AIA device 104 determining whether the received egress packet was received from one of the essential inline tools. If the packet was received from all of the essential inline tools but not yet from any or all of the non-essential inline tools, the AIA device 104 may disregard the missing non-essential tools' packets and proceed directly to step 518 described below. At least in some embodiments a user may pre-configure a minimum number of non-essential tools that packets must be received from for the AIA device 104 to proceed. If the packet was received from one of the non-essential inline tools, the AIA device 104 may disregard this packet and wait for the next one to arrive back in step 502. Furthermore, since the AIA device 104 effectively uses packet signatures of the packets it sends to the inline tools 202-208 to detect them when they come back to the device 104, any new packets "injected" by the inline tools 202-208 are treated as unexpected packets and are dropped by the AIA device 104. According to an embodiment of the present invention, a user may be enabled to configure the MAC address of a corresponding inline tool 202-208. In this embodiment, step 504 further involves the AIA device 104 determining whether the received packet comprises an injected packet based on a user-configurable MAC address and proceeding directly to step 518 described below.

In step 506, according to an embodiment of the present invention, after parsing the header of the received egress packet, the AIA device 104 generates the hash table index 308 using extracted information associated with the packet header 302. Since the AIA device 104 uses the same function in steps 406-408 and 506-508 and since the hash function is deterministic, when the same hash key (i.e., same packet header fields) is supplied the same hash value will be returned.

Next, in step 508, the AIA device 104 utilizes the generated index for a retrieval of the packet identification information 310 from the hash table 306. The retrieved packet identification information uniquely identifies a particular packet stored in the packet table 306. Once the AIA device 104 identifies the received packet, it increments the counter 314 associated with the received packet's entry. As noted above, the AIA device 104 utilizes the counter 314 to determine a number of inline tools 202-208 that have already processed and returned the corresponding packet.

According to an embodiment of the present invention, at step 512, the AIA device 104 compares a timer value T of the latency timer which was started in Step 416 with the estimated maximum expected tool latency value. Here, the maximum tool latency value is a stand-by time limit for automatically making a determination of a packet being dropped by at least one of the inline tools 202-208 when the processing time for any packet is longer than this pre-set period. In other words, at step 512, the AIA device 104 determines if the timer value T is greater than 0. In response to determining that value T is greater than 0 (decision block 512, "Yes" branch), the AIA device 104 continues to wait for additional copies of the packet being returned by other inline tools 204-208 and returns back to step 502.

According to an embodiment of the present invention, in response to determining that the latency timer has expired (decision block 512, "No" branch), at step 514, the AIA device 104 determines if the associated counter's 314 value is less than the total number of inline tools 202-208 in the chain. In other words, the AIA device 104 determines if the pre-set maximum processing time period has expired and not all of the inline tools 202-208 had returned the corresponding packet (decision block 514, "yes" branch). This scenario typically means that at least one of the inline tools 202-208 made a processing decision to drop this packet. If so, the AIA device 104 drops the packet as well in step 516. An alternative embodiment may implement a "majority" rule. In this embodiment, the AIA device 104 decides to transmit the packet if the number of inline tools 202-208 that returned the corresponding packet exceeds a predetermined threshold. Responsive to a determination that the pre-set maximum processing time period has expired and all (or high enough number exceeding the predetermined threshold) of the inline tools 202-208 had returned the corresponding packet (decision block 514, "No" branch), the AIA device 104 retrieves the copy of the packet from the packet table 306 and transmits the packet to the egress port 112, which in turn forwards the egress packet to a particular switching device i.e., switch 102*n*, or to the SSL device 202, so that the SSL device 202 can forward the encrypted form of the packet to the particular switching device (step 518). Next, at step 520, the AIA device 104 frees the hash entry in the packet table 306 associated with the packet returned to the network (step 520).

In summary, an Advanced Inline Aggregation (AIA) device connected to a chain of inline tools compensates the additive latency of every inline tool in a chain by forwarding the traffic through each tool in parallel. As another advantage, the approach contemplated by various embodiments of the present invention and described herein typically reduces so called jitter windows. At least some embodiments of the present invention can be used in concert with load-balancing devices to increase network links' throughput and availability while minimizing performance metrics such as, but not limited to, packet latency and packet jitter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a plurality of inline tools configured to monitor and analyze a flow of network traffic; and
   an Advanced Inline Aggregation (AIA) device connected to the plurality of inline tools, the AIA device having stored therein a plurality of programming instructions, which when executed on the AIA device cause the AIA device to:

process an ingress packet to extract a plurality of packet header fields and to generate a packet identifier and to determine whether a received ingress packet includes a packet injected by one of the plurality of inline tools devices based on a user-configurable MAC address;

transmit the ingress packet directly to a switching device as an egress packet in response to determining it includes a packet injected by one of the plurality of inline tools devices based on a user-configurable MAC address;

generate a first hash index by hashing information associated with the plurality of packet header fields;

store a copy of the ingress packet and the packet identifier in a hash table entry using the generated first hash index;

simultaneously forward the ingress packet to each of the one or more inline tool devices;

start a latency timer with a predefined timer value;

process an egress packet received from one of the plurality of inline tools to extract the plurality of packet header fields;

generate a second hash index by hashing information associated with the plurality of packet header fields;

retrieve the packet identifier from the hash table based on the generated second hash index;

increment a counter value associated with the egress packet;

determine whether the latency timer is greater than zero;

determine whether the counter value is equal to a total number of devices included in the plurality of inline tool devices, in response to determining that the latency timer is equal to zero; and transmit the egress packet to a switching device based on the retrieved packet identifier, in response to determining that the counter value is equal to the total number.

2. The system of claim 1, wherein the predefined timer value is equal to estimated maximum expected tool latency.

3. The system of claim 1, wherein the programming instructions which cause the AIA device to generate the first hash index further comprises programming instructions to use a hash function mask.

4. The system of claim 1, further comprising programming instructions which cause the AIA device to drop the egress packet, in response to determining that the counter value is less than the total number of the devices included in the plurality of inline tools.

5. The system of claim 1, wherein the system further comprises a Secure Sockets Layer (SSL) proxy device connected to the AIA device in a serial fashion.

6. The system of claim 5, wherein the ingress packet comprises an encrypted packet and wherein the SSL proxy device is configured to decrypt the ingress packet received from the AIA device.

7. The system of claim 1, wherein the one or more inline tool devices comprise at least one of a firewall device, an Intrusion Prevention System (IPS), and the like.

8. The system of claim 1, wherein the programming instructions which cause the AIA device to determine whether the latency timer is greater than zero further comprise programming instructions to wait for additional egress packets in response to determining that the latency timer is greater than zero.

9. The system of claim 1, wherein programming instructions to process the egress packet comprise programming instructions to determine whether the egress packet comprises an injected packet based on a MAC address of the corresponding inline tool from which the egress packet was received.

10. The system of claim 4, further comprising programming instructions which cause the AIA device to forward the egress packet, in response to determining that the egress packet is only associated with a device included in a category of non-essential inline tools.

11. The system of claim 1, wherein programming instructions which cause the AIA device to transmit the egress packet to the switching device, further cause the AIA device to transmit the egress packet, in response to determining that the counter value exceeds a predetermined threshold indicative of a number of the devices that need to send the egress packet in order for the egress packet to be transmitted to the switching device.

12. The system of claim 1, wherein programming instructions which cause the AIA device to process the ingress packet to extract the plurality of packet header fields and to generate the packet identifier include programming instructions to determine whether the packet header fields include any fields configured to be modifiable by one or more inline tools and to disregard the determined modifiable fields when generating the packet identifier for the ingress packet.

13. The system of claim 12, wherein programming instructions which cause the AIA device to process the egress packet received from one of the plurality of inline tools to extract the plurality of packet header fields include programming instructions to determine whether the packet header fields include any fields configured to be modifiable by the one of the plurality of inline tools and to disregard the determined modifiable fields when extracting the plurality of packet header fields for the egress packet.

14. A method for parallel processing of ingress packets destined to a plurality of inline tools, the method comprising:

processing, by an Advanced Inline Aggregation (AIA) device connected to the plurality of inline tool devices, an ingress packet to extract a plurality of packet header fields and to generate a packet identifier and to determine whether a received ingress packet includes a packet injected by one of the plurality of inline tools devices based on a user-configurable MAC address;

transmit the ingress packet directly to a switching device as an egress packet in response to determining it includes a packet injected by one of the plurality of inline tools devices based on a user-configurable MAC address;

generating, by the AIA device, a hash index by hashing information associated with the plurality of packet header fields;

storing, by the AIA device, a copy of the ingress packet and the packet identifier in a hash table entry using the generated hash index; and simultaneously forwarding, by the AIA device, the ingress packet to each one of plurality of inline tool devices.

15. The method of claim 14, further comprising starting, by the AIA device, a latency timer with a predefined timer value.

16. The method of claim 15, wherein the predefined timer value is equal to estimated maximum expected tool latency.

17. The method of claim 14, wherein processing the ingress packet to extract the plurality of packet header fields and generating the packet identifier further comprises determining whether the packet header fields include any fields configured to be modifiable by one or more inline tools and disregarding the determined modifiable fields when generating the packet identifier for the ingress packet.

18. A method for parallel processing of egress packets received from a plurality of inline tools, the method comprising:
- processing, by an Advanced Inline Aggregation (AIA) device connected to the plurality of inline tool devices, an egress packet to extract a plurality of packet header fields and to determine whether a received ingress packet includes a packet injected by one of the plurality of inline tools devices based on a user-configurable MAC address;
- transmit the ingress packet directly to a switching device as an egress packet in response to determining it includes a packet injected by one of the plurality of inline tools devices based on a user-configurable MAC address;
- generating, by the AIA device, a hash index by hashing information associated with the plurality of packet header fields;
- retrieving, by the AIA device, a packet identifier from a hash table based on the generated hash index;
- incrementing, by the AIA device, a counter value associated with the egress packet;
- determining, by the AIA device, whether a latency timer with a predefined timer value is greater than zero; and
- determining, by the AIA device, whether the counter value is equal to a total number of devices included in the plurality of inline tool devices, in response to determining that the latency timer is equal to zero.

19. The method of claim 18, further comprising transmitting, by the AIA device, the egress packet to a switching device or to a SSL device based on the retrieved packet identifier, in response to determining that the counter value is equal to the total number of devices included in the plurality of inline tool devices or in response to determining that the counter value exceeds a predetermined threshold indicative of a number of the devices that need to send the egress packet in order for the egress packet to be transmitted to the switching device.

20. The method of claim 18, further comprising dropping the egress packet, in response to determining that the counter value is less than the total number of devices included in the plurality of inline tool devices.

* * * * *